United States Patent Office 3,539,646
Patented Nov. 10, 1970

3,539,646
PHENOLS AND PHENOLIC RESINS
Bobby F. Dannels and Alvin F. Shepard, Grand Island,
N.Y., assignors to Hooker Chemical Corporation,
Niagara Falls, N.Y., a corporation of New York
No Drawing. Continuation-in-part of application Ser. No.
276,147, Apr. 29, 1963. This application Jan. 30, 1967,
Ser. No. 612,334
Int. Cl. C07c 37/00, 43/20
U.S. Cl. 260—613   3 Claims

ABSTRACT OF THE DISCLOSURE

Phenols, phenyl ethers, bisphenols, diethers, mixed phenol ethers and phenolic resins are prepared by reacting a phenol with a non-conjugated open-chain aliphatic or cycloaliphatic polyunsaturated hydrocarbon. The phenols are useful as trichloroethylene stabilizers and for preventing the development of early blight disease on plant foliage. The phenyl ethers are solvents for gum and resins and are high temperature lubricants. The bisphenols can be esterified with dibasic acids or their derivatives to form new polyester plastics which have usually good electrical properties and the phenolic resins can be used in molding compounds and varnishes.

CROSS-REFERENCES TO RELATED APPLICATIONS

This is a continuation-in-part of copending application Ser. No. 276,147, filed Apr. 29, 1963 and now abandoned.

BACKGROUND OF THE INVENTION

This invention relates to new phenols and to phenolic resins which may be prepared from the new phenols. The phenolic resins used by the modern plastics industry are prepared by the reaction of phenol with a carbonyl compound or derivative. In each case the phenol linking bridge contains one carbon atom and is considered to be inflexible.

New phenols and phenolic resins have now been discovered which provide longer carbon chain bridges between phenolic nuclei.

SUMMARY OF THE INVENTION

In accordance with the invention there are provided reaction products of phenol and non-conjugated aliphatic poly-unsaturated hydrocarbons having sites of unsaturation separated by at least two carbon atoms. A process for preparing these products is also within the invention. The products of the invention are useful in the preparation of resins and high polymers, in applications requiring resins and molding compounds, and the like.

DESCRIPTION OF THE PREFERRED EMBODIMENTS

The non-conjugated aliphatic polyunsaturated hydrocarbon of the invention (short designation NAPH) can be cyclic or open-chain. NAPH is distinguished by the number of carbon atoms it contains, by the sites of unsaturation, and by being free of tertiary double bonds. These compounds contain from 7 to 21 carbon atoms in the main structure. The unsaturation sites are partially dependent on the configuration of NAPH. When NAPH is cyclic, 2 or more carbon atoms are between the carbon-to-carbon double bonds to make the product useful. However, when NAPH is open-chain, 3 or more carbon atoms are present between the carbon-to-carbon double bonds. Fewer intervening carbon atoms than those mentioned above may result in the formation of compounds which are not the products of the invention. The points of unsaturation may be unsymmetrical in respect to each other point of unsaturation, provided with requisite carbon spacing between sites of unsaturation is maintained. The maximum amount of unsaturation in NAPH is limited by the number of carbon atoms in the main structure of the spacing requirements.

Typical of compounds embraced with the definition of NAPH are those open-chain, aliphatic compounds of the Formula:

$C_mH_{2m-2}$ where $m$ equals 7 to 21
$C_qH_{2q-4}$ where $q$ equals 12 to 21
$C_vH_{2v-6}$ where v equals 17 to 21 and non-substituted cycloaliphatic compounds of the formula:

$(C_4H_6)_n$ where $n$ equals 3 to 5
$C_yH_{2y-4}$ where $y$ equals 8 to 21
$C_xH_{2x-5}$ where $x$ equals 12 to 21
$C_wH_{2-8}$ where $w$ equals 16 to 21

It is within the scope of this invention that NAPH may be halogenated or substituted with such groups as methyl, ethyl or phenyl. Furthermore, cis and trans configurations of NAPH may be used alone or in combination, in addition to other isomeric variations of the same compound.

Especially useful are NAPH such as those (a) based on or derivable from butadiene, such as 1,5-cyclooctadiene, 1,5,9-cyclododecatriene, 1,5,9,13-cyclohexadecatetraene, 1,5-dichloro-1,5-cyclooctadiene and (b) other such as 4-methyl-1,7-octadiene, 1,7-octadiene, 1,9-decadiene, 1,13-tetradecadiene and 1,11-dodecadiene.

Examples of phenols which may be used in practicing the invention include phenol itself or substituted phenols of the formula:

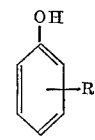

where R may be H, F, Cl, Br or a suitable substituent selected from the following:
(a) Alkyl groups of 1 to 18 carbon atoms in any of their isomeric forms and substituted on the phenolic nucleus in the ortho, meta or para positions;
(b) Alicyclic groups of 5 to 18 carbon atoms, e.g., cyclohexyl, cyclopentyl, methyl cyclohexyl, butyl cyclohexyl;
(c) Aromatic or aralkyl groups of 6 to 18 carbon atoms, e.g., phenyl, alpha-methyl benzyl, benzyl, cumyl;

(d) Alkyl, alicyclic, aryl and aralkyl ketones wherein the hydrocarbon is defined as hereinbefore; and (e) Alkyl, alicyclic, aryl and aralkyl carboxylic groups wherein the hydrocarbon is defined as hereinbefore.

Suitable substituted phenols include the following: resorcinol, hydroquinone, para-tertiary-butylphenol, para-secondary-butylphenol, para-tertiary hexylphenol, para-isooctyl-phenol, para-phenylphenol, para-benzylphenol, para-cyclohexylphenol, para-decylphenol, para-dodecyl-phenol, para-tetra-decylphenol, para-octa-decylphenol, para-nonylphenol, para-cresol, para-beta-naphthylphenol, para-alpha-naphthylphenol, para-pentadecylphenol, para-cetylphenol, para-cumylphenol, para-hydroxy acetophenone, para-hydroxybenzophenone, as well as the corresponding ortho and meta derivatives such as meta-butylphenol, meta-cresol and ortho-butylphenol, as well as mixtures thereof.

The pure refined phenols may be used, but this is not always necessary. For instance, the phenols may be alkylated and then reacted with an olefin as a crude product which may contain some polyalkylated as well as unalkylated phenols. Mixtures of phenols mentioned herein may also be used.

From the foregoing, it is apparent that a wide variety of monophenols may be used in practising the present invention provided that the phenol employed is sufficiently active to be capable of reacting with the NAPH of this invention. The choice of position substitution is important when the novolac type of resin is prepared. The meta-substituted phenol has three reactive positions and may be utilized to form novolacs which are capable of being transformed into hard, insoluble and infusible materials by the addition of a methylene donor and the application of heat. On the other hand, ortho and para substituted phenols generally yield novolac-type resins which remain thermoplastic.

In addition to the above-mentioned phenol, di-substituted meta phenols may be used in the practice of this invention, if so desired.

The reaction products of the above-described NAPH and phenols may be broadly classified as phenols, ethers, and mixed phenol ethers. All of the foregoing reaction products are prepared by the same preferred process, variations being made as to reaction conditions for the production of the one preferred class of reaction products. While charging the desired amount of phenol to the reaction vessel the desired amount of catalyst is added and stirred until well dispersed. Thereafter the resulting solution or mixture is heated and the NAPH is gradually added over a predetermined period of time. The heating is then continued for an additional period of time to insure that the reaction is advanced to the desired degree of completion. Thereafter the reaction mixture is neutralized and the unreacted phenol and resulting water, if any, are distilled off under vacuum. The reaction products are then ready for purification and separation.

The suitable catalyst for use in the foregoing process are acid catalysts. Among the more useful catalysts are boron trifluoride and sulfuric acid. Additional useful catalysts include phosphoric acid, aluminum phenate, aluminum chloride, Friedel-Craft class catalysts and acidic ion exchange resins. Catalysts employed to prepare the products of this invention are generally utilized in amounts up to about 5 percent of the phenol charged. Small amounts of catalysts, that is, about one-tenth of one percent may be employed when the desired reaction products are the ether type product. It is preferable that from about one-half percent to about 3½ percent of acid catalysts should be present when the desired reaction products are to be phenolic in nature. Upon the completion of the desired reaction the catalyst may be neutralized by charging to the reaction mixture a suitable neutralizing agent, such as a slurry of lime, sodium bicarbonate, calcium bicarbonate or an alkali such as sodium hydroxide in solution.

The inventive reaction products may be prepared at temperatures ranging from less than ambient room temperature that is about 10 degrees centigrade to about 250 degrees centigrade. However, the reaction temperature will not usually exceed about 200 degrees centigrade and it should usually be greater than 20 degrees centigrade. Very mild reaction conditions are desirable for the formation of the ethers of this application. The temperature employed should be less than about 50 degrees centigrade and may be as low as 10 degrees centigrade but it is preferable that the reaction temperature be from about 20 degrees to about 45 degrees centigrade. The phenols of this invention are best prepared by employing temperatures from about 50 degrees to about 170 degrees centigrade.

The reaction products of phenols and NAPH may be broadly classified as phenols, ethers or phenolic ethers and may then be further sub-divided into mono-phenols, bisphenols, novolacs, mono-ethers, diethers and mixed phenol ethers. Preparation of each of the broad classes of materials, that is, ethers and phenols, is dependent upon temperature and catalyst conditions in the reaction vessel. Additionally, the preparation of the various sub-classes depends upon the ratios of reactants charged to the reaction vessel. These ratios, when stated in terms of the amount of phenol employed, result in the products as follows:

(a) Mono-phenols and mono-ethers result when the molar ratio is substantially 1:1;

(b) Bisphenols, diethers and mixed phenol ethers result when at least about two or more moles of phenol are charged per mole of NAPH;

(c) Novolac type resins are made with a slight molar excess of phenol, i.e., at least about 10 mole percent; and generally up to about 90 mole percent, and when the reaction is sustained at high temperatures for a suitable time.

It is believed that the reaction products formed when equal moles of phenol and cyclic NAPH are reacted undergo a structural change. The addition reaction is that which normally follows from the reaction of a hydrogen donor compound with an unsaturated compound. At the completion of this reaction there should be places of unsaturation remaining since each NAPH has two or more points of unsaturation and only one is utilized in the reaction of one mole of phenol; however, bromination studies have not disclosed any ethylenic unsaturation in the product. Instead, these studies indicate that substantially all of the bromine which is consumed by the reaction product is consumed on a substitution basis and suggests that the resulting phenols and ethers have in addition to the phenol ring, a polycyclic structure adjoining. Probable structures are as follows (The phenol is described in column 1):

(a) The reaction products of phenol and 1,5-cyclooctadiene

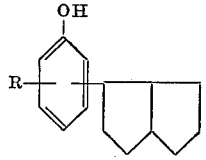 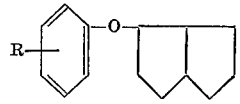

and (b) the reaction products of phenol and 1,5,9-cyclododecyltriene

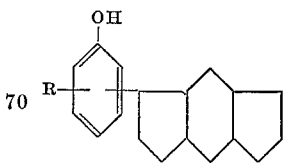 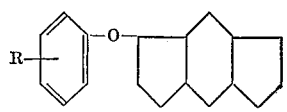

In contrast with the cyclic NAPHs discussed above, the linear NAPHs retain their characteristic structure and undergo the addition reaction. A typical reaction is the equimolar reaction of phenol with 1,7-octadiene to yield a polycyclic structure as indicated by formulas below. Again, for convenience, it is sufficient to show one isomer.

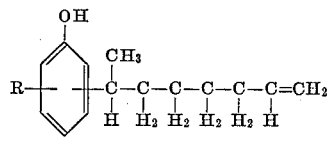

and

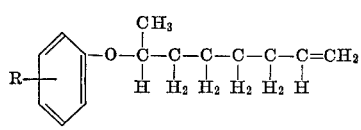

A second isomer of these compounds may also be obtained by substitution on the first carbon of 1,7-octadiene.

The reaction of two moles of phenol with one mole of NAPH results in products which may be broadly described as bisphenols, ethers, and mixed ether-phenolics. In the case where the cyclic NAPH is a triene the reaction product additionally undergoes a rearrangement as evidenced by the substitution of bromine when the product is subject to bromination. When the reactions are phenol and 1,5-cyclooctadiene the following products are obtained, depending on the reaction conditions employed. While both the 1,5 and 1,6 cyclooctane isomers may be prepared for convenience only the 1,5 isomer is shown below.

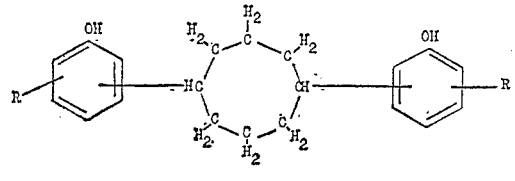

The reaction products when 1,5,9-cyclododecatriene is employed, in addition to forming diethers, bisphenols and mixed ether phenolics, also undergo a rearrangement to a polycyclic structure as indicated by formulas below. Again, for convenience, it is sufficient to show one isomer.

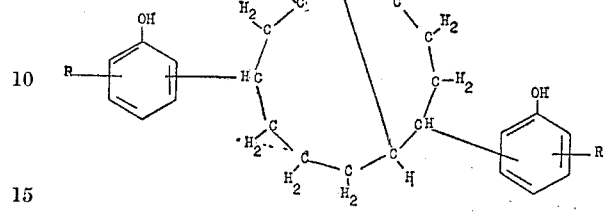

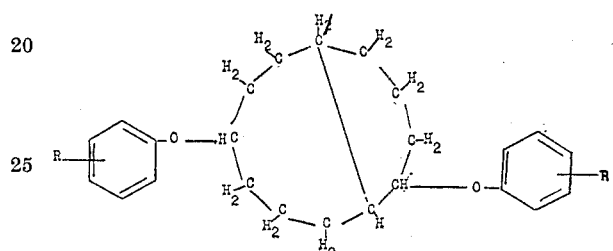

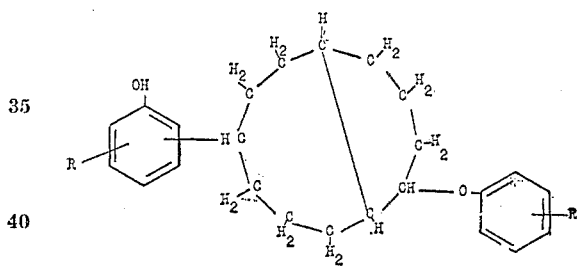

The reaction products of this invention also include novolac-like resins which result from the gradual addition of the desired NAPH to phenol under conditions similar to that used in the preparation of bisphenols of this invention. These novolacs are permanently fusible resins, containing up to about 20 phenolic nuclei. Very useful novolaks are prepared which contain from three to about seven repeating phenolic nuclei in the reaction products. It is to be appreciated that when the phenol is phenol itself, then the resulting novolac may contain branched structures. However, these branched structures have the characteristics of the linear novolac with respect to fusibility and solubility. The novolacs, with the addition of methylene donors such as hexamethylenetetramine, and the application of heat will set to be a hard insoluble, infusible plastic material. Typical novolacs prepared by this process include the reaction products of phenol and 1,5-cyclooctadiene.

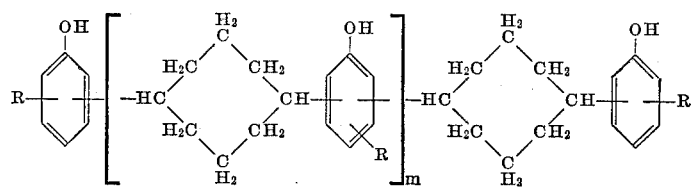

m = 1 to 20 the novolac which is the reaction product of phenols and 1,7 octadiene

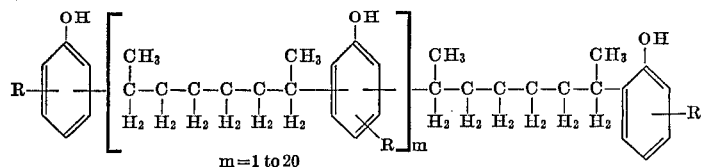

and the novolac which is the reaction product of phenols and 1,5,9-cyclododecyltriene.

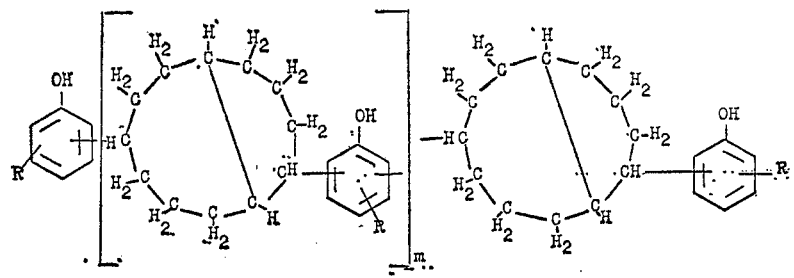

m = 1 to 20

Similar phenols, bisphenols and novolacs result when other NAPH members are reacted with phenol in the process of this invention.

A carbon-to-carbon double bond is to be expected in the eight member ring of the one to one molecular condensates. By the same rationale carbon-to-carbon double bonds are expected to be in the twelve member ring when 1 and 2 moles of phenol are condensed with one mole of NAPH. The presence of a double bond is demonstratable by the addition of bromine, following the method of P. C. McIlhiney, Journal American Chemical Society vol. 16, page 275. For results of this analysis, see table below:

boiling point between 190 degrees to 240 degrees centigrade at 0.25 mm. of mercury was obtained, which contained the desired bisphenol. Additionally, a polycyclic monophenol without ethylenic unsaturation was also formed. This monophenol has similar properties to that obtained by the direct addition of phenol to cyclooctadiene. Substantially the same results have been obtained when the polyolefin is cyclododecatriene.

The equal molecular compounds of phenol and NAPH may be used as either the end products or as an intermediate. The monophenols, for example, stabilize trichloroethylene against deterioration. The monophenol from cis, trans, trans, 1,5,9-cyclododecatriene forms an N-methylcarbamate which is very active in preventing the development of early blight disease on plant foliage. The monoethers are solvents for gum and resins and may be used as high temperature lubricants. Additionally, monophenols

TABLE.—BROMINATION OF PHENOL-CYCLOOCTADINE PRODUCTS

| Sample | Time reacted, Hours | Atoms bromine consumed per mole phenol | Moles HBr formed per mole | Atoms Br added per mole | Moles excess HBr formed per mole |
|---|---|---|---|---|---|
| o-Monophenol | 20 | 9.27 | 5.18 | | 0.55 |
| p-Monophenol | 20 | 8.42 | 4.69 | | 0.48 |
| p-Monophenol | 19 | 7.43 | 4.05 | | 0.34 |
| p-Monophenol | 1.5 | 5.94 | 3.28 | | 0.31 |
| p-Monophenol | 0.5 | 5.41 | 3.02 | | 0.31 |
| Phenol ether | 3 | 5.14 | 2.81 | | 0.24 |
| Phenol ether and monophenols | 3 | 7.28 | 3.74 | | 0.10 |
| Monophenol from dibromocyclo-octane | 4 | 3.59 | 1.72 | 0.15 | |
| Cyclododecatriene reaction product dist., 175–185° C. at 0.5 mm. mercury | 20 | 3.82 | 1.90 | 0.02 | |
| Cyclododecatriene reaction product dist. residue | 20 | 6.28 | 2.86 | 0.57 | |
| Comparatives: | | | | | |
| Cashew nut oil | 24 | 8.2 | 1.88 | 3–4.3 | |
| Cyclooctadiene | 24 | 3.89 | 0.28 | 3.33 | |
| Phenol | 2 | 4.33 | 2.18 | 0.02 | |
| Blank | 2 | meg. Br–9.12, found 9.20 meg., HBr found 0.01 | | | |

In only a few instances is there evidence of bromine addition, and even here the amount added was insignificant.

All available evidence indicates that the double bond expected is not present. The validity of the bromine method of analysis is substantiated by applying it to the phenol itself and to a cashew shell oil phenol containing an unsaturated side chain. No unsaturation was found in phenol while cashew shell oil showed the presence of the expected double bonds. Furthermore, the infrared spectra of the products do not have a band attributable to the normal carbon double-bond absorption.

An alternative route to the phenolcyclooctadiene condensates is by addition of hydrobromic acid to the cyclooctadiene to give dibromocyclooctane. Good yields are obtained in this step. Thereafter the dibromocyclooctane was reacted with an excess of phenol using ferric chloride as a catalyst in the expectation of forming a bisphenol. Upon distillation of the reaction mixture, a fraction having are hardened by the reaction of hexamethylenetetramine or formaldehyde yielding products which are unusually resistant to discoloration on heating in air.

Likewise, the phenols formed by the addition of more than one molecule of phenol to the NAPH may also be used as intermediates or as final end products. These phenolic resins may also be esterified with di-basic acids or their derivatives such as the anhydrides or acid halides to form new polyester plastics which, because of the cycloaliphatic residues present, have unusually good electrical properties. As a final end product, these resins all become heat hardenable when mixed with hexamethylenetetramine or other methylene donors.

Useful phenolic resins may be prepared from the novolacs described above. The novolac is ground to the desired particle size and the desired amount of methylene linked donor material such as hexamethylenetetramine is admixed. The basic resin is now ready for use in molding compounds and varnishes. However, modification of the basic resin may be made by admixing, either singularly or in combination, fillers and novolacs prepared by the reaction of phenols and aldehydes.

The use of fillers with the compounds in this invention is optional and dependent upon the final properties desired in the article being molded. Such fillers may include one or more of the following: glass, quartz, mica, wood-flour, asbestos, cellulose, graphite, coloring matter and others. The Technology of Plastic and Resins, Mason, J. P. and Manning J. F., Van Nostrand Company (1945) at page 396 et seq. describes other fillers and reasons for their employment, such as to change densities or the chemical resistance of phenolic resins.

The practice of this invention is illustrated by but not limited to the examples given below which describe preferred forms thereof. All parts are by weight and all temperatures are in degrees centigrade unless otherwise stated.

EXAMPLE 1

Preparation of solid monophenol from cyclooctadiene

Cyclooctadiene-1,5-(pure grade) (54 grams or 0.5 mole) was added dropwise during 60 minutes to a stirred mixture of phenol (1005 grams or 10.7 moles) and boron trifluoride (18.0 grams) at 40–45 degrees centigrade in a reaction vessel or pot. After an additional 20 hours at room temperature the reaction mixture was heated to approximately 50 degrees to liquefy the solids present, and was washed with one liter of eight percent aqueous $NaHCO_3$. Water and unreacted phenol were then removed by a simple distillation. The pot temperature was increased to 150 degrees at 20 mm. of mercury pressure. The vapor temperature went to 105 degrees. The crude product obtained was weighed (136 grams), transferred to a smaller pot and distilled under vacuum. A fraction boiling at 160–174 degrees at 3 mm. of mercury was collected (65 grams) which partially crystallized on standing. Recrystallization from petroleum ether (3 times) resulted in a colorless crystalline material (M.P. 106–109 degrees) having the following analysis:

Calculated for $C_8H_{13} \cdot C_6H_5OH$ (percent): OH, 8.4; C, 83.2; H, 8.9. Found (percent): OH, 8.36; C, 82.8; H, 9.5.

The infrared spectrum of this solid monophenol showed no absorption characteristic of an ethylenic bond. The spectrum also indicated monosubstitution of the phenol in the para position. On bromination in $CCl_4$ solution for 20 hours by the method of McIlhiney 8.32–8.42 atoms of $Br_2$ were absorbed per mole of the phenol and 4.69–4.88 moles of HBr were liberated, indicating that bromine reacted by substitution rather than by addition at an ethylenic bond.

EXAMPLE 2

Preparation of monophenol from cyclooctadiene— higher temperature

Cyclooctadiene,1,5-(108 g.) 1.0 m.) was added dropwise during 65 minutes to a stirred mixture of phenol (1000 grams) and $BF_3$ (30 grams) at 146–155 degrees. After an additional 2 hours, at 150 degrees the reaction mixture was cooled and worked up as in Example 1. The monophenol fraction boiling at 143–153 degrees at 1 mm. of mercury pressure weighed 61 grams.

EXAMPLE 3

Preparation of monophenol from cyclooctadiene— lower mole ratio

Cyclooctadiene,1,5-(108 g., 1.0 m.) was added dropwise to a stirred mixture of phenol (141 g., 1.5 m.) and $BF_3$ (2.8 g.) during 90 minutes. The temperature was 92–105 degrees. Heating at 100 degrees was continued for an additional four and one-half hours. Work up of the reaction mixture was as in Example 1. The monophenol fraction boiling at 160–185 degrees at 5 mm. of mercury pressure weighed 70 grams.

EXAMPLE 4

Preparation of liquid monophenol from cyclooctadiene

A reaction product prepared from phenol and 1,5-cyclooctadiene by a procedure similar to that described in Example 1 was subjected to vacuum distillation which yielded 141.5 grams of a liquid boiling from 143–153 degrees at 1.5 mm. of mercury. To this were added 600 grams of 10 percent aqueous NaOH. On cooling and standing overnight a precipitate formed (sodium salt of the solid monophenol). About 2 liters of acetone were added and the solid precipitate was filtered off and set aside. Acetone was removed from the filtrate by distillation and the remaining aqueous residue was extracted with either yielding 68 grams of light brown oil. Fractional distillation through an 18"x½" packed column yielded the following cuts.

| Cut: | Vapor temperature | Pressure, mm. of mercury | Wt. g. | $n_D^{25}$ |
|---|---|---|---|---|
| 1 | 98–112 | 0.7 | 2.3 | 1.5492 mostly insoluble in 10% NaOH. |
| 2 | 110–120 | 0.7 | 7.2 | 1.5572. |
| 3 | 120–123 | 0.7–0.5 | 15.5 | 1.5596 7.89% OH, sol. in 10% NaOH. |
| 4ᵃ | 123–124.5 | 0.5–0.6 | 26.0 | 1.5603 8.28% OH, sol. in 10% NaOH. |
| 5 | 124.5–120 | 0.5–0.45 | 8.5 | 1.5613 8.31% OH, sol. in 10% NaOH. |

ᵃ Hereafter referred to as liquid monophenol.

The hydroxyl contents of Cuts 3, 4 and 5 (7.89–8.31%) show that these are monophenols of the general formula $C_8H_{13} \cdot C_6H_4OH$ formed by the union of one molecule each of cyclooctadiene and phenol. The infrared spectrum of the liquid monophenol indicated it to be a monosubstituted phenol with an orthosubstituent and to contain no ethylenic bond. Bromination of the liquid monophenol in $CCl_4$ solution for 20 hours by the same procedure used with the solid monophenol in Example 1 also failed to reveal double bonds. A total of 9.27 atoms of bromine were consumed per molecule of phenol but 5.18 moles of HBr were liberated.

The liquid monophenol was also converted to an N-methyl carbamate by reaction with stoichiometric proportions of N-methyl carbamyl chloride and triethylamine. After three recrystallizations from petroleum ether the derivative melted at 89–91.5 degrees and contained 5.5 percent N (theory for $C_8H_{13}C_6H_4OCONHCH_3$—5.4% N).

The liquid monophenol is considerably more soluble in aqueous alkali than the solid monophenol. From the material precipitated by treatment with 10 percent aqueous caustic as mentioned above there were recovered by neutralization and crystallization from petroleum ether 32 grams of solid monophenol having M.P. of 100–106 degrees.

Both the liquid monophenol and the solid monophenol of Example 1 harden when heated with hexamethylenetetramine or paraformaldehyde and acid or alkaline catalysts but do not become insoluble in organic solvents.

EXAMPLE 5

Preparation of phenolic resins from cyclooctadiene

The high boiling residues obtained in Example 1 were further heated to 270 degrees under 1 mm. pressure to complete removal of the monophenol. The product was a permanently fusible red resin which was brittle when cold. On pulverization and mixing with about 10 percent of its own weight of pulverized hexamethylenetetramine the resin cured rapidly at 165 degrees to yield a hard insoluble mass. The resin was also rendered thermosetting by mixing with paraformaldehyde and acid or basic catalysts. The uncured resin was also somewhat soluble in toluene. Extraction of it with about 25 times its own weight of toluene yielded a soluble product which contained C—80.9% and H—8.4% while the undissolved high melting residue contained C—82.0% and H—8.7%. A bisphenol of the formula $HOC_6H_4 \cdot C_8H_{14} \cdot C_6H_4OH$ would contain C—81.1% and H—8.1% while a resin of the general formula $$HO_6H_4 \cdot C_8H_{14} \cdot C_6H_3OH \cdot C_8H_{14} \cdot C_6H_4OH$$

would contain C—81.9% and H—8.4%. The insoluble material cured readily with hexamethylenetetramine or paraformaldehyde at about 165 degrees.

Molding compounds of excellent dielectric strength may be prepared by compounding the above fusible resin with hexamethylenetetramine, wood flour or mica filler, color, wax, etc. as is customarily done with phenol-formaldehyde novolacs.

EXAMPLE 6

Preparation of phenolic ether from cyclooctadiene

Phenol and cyclooctadiene were reacted as in Example 1 except that the amount of $BF_3$ catalyst was reduced from 18 grams to 1 gram and the reaction time was cut to 4½ hours at 34–41 degrees. Distillation gave 20.6 grams of product boiling from 98–113 degrees under 0.5 mm. of mercury. This product contained 2.1 percent OH (theory for the monophenol $C_8H_{13} \cdot C_6H_4OH$—8.3%) indicating that it is largely an ether of the type $$C_8H_{13}OC_6H_5$$

On bromination, as in Example 1, it gave no evidence of unsaturation, 5.14–5.2 atoms of Br being absorbed and 2.81–2.83 moles of HBr being liberated. The infrared absorption spectrum also revealed no ethylenic unsaturation.

EXAMPLE 7

Preparation of phenolic ether from cyclooctadiene

Cyclooctadiene-1,5 (54 grams, 0.5 mole) and $BF_3$ (0.5 gram) were dissolved in 200 grams of n-hexane. To this solution, there were added dropwise 47 grams (0.5 m.) of phenol during 60 minutes. The reaction medium was maintained at 20–35 degrees by means of an ice bath. After an additional hour at room temperature, the catalyst was neutralized and the solvent and unreacted phenol and cyclooctadiene were stripped off. The residue was distilled under vacuum. A 22 g. fraction boiling at 104–106 degrees, at 0.5 mm. of mercury vacuum, was collected. This had a refractive index of 1.5435 and a low hydroxyl content.

EXAMPLE 8

Preparation of monophenol from cis, trans, trans-cyclododecatriene 1,5,9-cyclododecatriene (cis, trans, trans-isomer) (53 grams or 0.33 mole) was added dropwise to a stirred mixture of phenol (3015 grams or 32 moles) and $BF_3$ (54 grams) maintained at 90 degrees. After addition was complete the mixture was kept at 90 degrees for 5 hours and was then vacuum distilled after neutralization with aqueous $NaHCO_3$. A monophenol fraction (32 g.) boiling from 175–185 degrees under 0.5 mm. of mercury was obtained. This contained 6.74% OH (calculated for the monophenol $C_{12}H_{19} \cdot C_6H_4OH$—6.75% OH). The infrared spectrum of the material gave no indication of the presence of ethylenic bonds. On bromination for 20 hours by the method of Example 1, 3.82–4.74 atoms of Br were absorbed per mole of monophenol and 1.90–2.33 moles of HBr were liberated. These results indicate that the compound has formed by the addition of one mole of phenol to one double bond of the cyclic olefin and by the loss of the remaining two double bonds in cyclization reactions.

The carbamate of this phenol, prepared by the general procedure of Example 4, is highly effective as an agent for the control of foliar blight. The phenol hardens when heated with hexamethylenetetramine, paraformaldehyde, acid or alkaline catalysts but does not become insoluble in organic solvents.

EXAMPLE 9

Preparation of phenolic resin from cis, trans, trans-cyclododecatriene

The residue remaining after distilling off the monophenol of Example 8 was subjected to further heat and vacuum treatment to complete the removal of the monophenol. Material boiling below 210 degrees at 0.5 mm. of mercury was removed and 38.5 grams of a permanently fusible resin were obtained as a residue. This material resembled the resin of Example 5 and cured to a hard, insoluble mass when mixed with hexamethylenetetramine or paraformaldehyde and catalyst and heated to 165 degrees. Like the product of Example 5 it may be used to prepare thermosetting molding compounds having good luster and dielectric strength.

EXAMPLE 10

Preparation of monophenol and phenolic resin from trans, trans, trans-cyclododecatriene Using a procedure like that of Examples 8 and 9 the trans, trans, trans-isomer of 1,5,9-cyclododecatriene was reacted with phenol and the monophenol and phenolic resin recovered as before. These products were very similar to those obtained in Examples 8 and 9, the only difference noted being a slight difference in the infrared spectrum of the monophenol fraction boiling from 175–185 degrees under 0.5 mm. of mercury. The similarity between the products obtained from the cyclododecatriene isomers appears to be due to the loss of the ethylenic unsaturation responsible for the cis, trans isomerism of cyclododecatriene.

EXAMPLE 11

Preparation of a bisphenol from cyclooctadiene

Cyclooctadiene-1,5 (54 grams, 0.5 m.) was added dropwise during 55 minutes to a stirred mixture of phenol (1000 grams) and $BF_3$ (18 grams) at 97–100 degrees. After an additional 5½ hours at 100 degrees, the product was worked up as in Example 1. A monophenol fraction, boiling at 150–158 degrees, at 2 mm. of mercury pressure and weighing 61 grams, was obtained. The pressure was reduced to 0.4 mm. of mercury, and a bisphenol fraction, boiling at 200–245 degrees was collected. This was a red, viscous liquid having a hydroxyl content of 9.2 percent. The crude bisphenol fraction thus obtained contains an ethereal component, because a bisphenol of the general formula $HOC_6H_4 \cdot C_8H_{14} \cdot C_6H_4OH$ would contain 11.5 percent OH.

EXAMPLE 12

Preparation of a bisphenol from cyclooctadiene

The material remaining after distilling off the phenolic ether and monophenol of Example 6 was subjected to a further distillation. A fraction boiling at 225–245 degrees at 0.5 mm. of mercury pressure was collected. This weighed 25 grams and was a red viscous liquid. It had a hydroxyl content of 8.62 percent.

EXAMPLE 13

Preparation of a bisphenol [di(hydroxyphenyl) octane] and monophenol from 1,7-octadiene To a mixture of 470 grams phenol and 12 grams $BF_3$ at 60 degrees there were added dropwise during 60 minutes, 27.6 grams of 1,7-octadiene. After an additional hour at 60–70 degrees, the mixture was cooled to 40 degrees and washed with a saturated aqueous solution of $NaHCO_3$ and then with water. After distilling off the dissolved water and phenol, there were obtained 65 grams of viscous light colored fluid. This was then distilled under vacuum. A monophenol fraction boiling at 110–120 degrees at .25 mm. of mercury was obtained. This product weighed 11.4 grams and had a hydroxyl content of 7.8 percent. A monophenol of the type $HOC_6H_4\text{-}C_8H_{15}$, has a hydroxyl content of 8.3 percent.

The bisphenol fraction weighed 31.4 grams and distilled over at 190–201 degrees at .4 mm. of mercury vacuum. It was a viscous pale yellow colored liquid with a hydroxyl content of 11.1 percent. A bisphenol of the type $HOC_6H_4\text{-}C_8H_{16}\text{-}C_6H_4OH$ has a hydroxy content of 11.38 percent. The still bottoms weighed 7.8 grams. This was a hard, brittle phenolic resin with a hydroxyl content of 8.8 percent. The bisphenol and the phenolic resin cured at 165 degrees when mixed with 10 percent of their own weight of hexamethylenetetramine. The cured resins were tough, insoluble materials having outstanding flexibility while hot. They were also surprisingly resistant to discoloration at elevated temperatures.

Various changes and modifications may be made and equivalents may be substituted in the method and composition of this invention, certain preferred forms which have been herein described, without departing from the scope of this invention. Such modifications are to be regarded as within the scope of the invention.

We claim:

1. A product of the acid catalyzed reaction of at least about two moles of phenol with one mole of a compound selected from the group consisting of 1,5-cyclooctadiene, 1,5,9-cyclododecatriene, 1,5,9,13 - cyclohexadecatetraene and 1,5-dichloro-1,5-cyclooctadiene, conducted at a temperature from about 10 to abut 250 degrees centigrade.

2. A product according to claim 1 wherein the compound is 1,5-cyclooctadiene.

3. A product according to claim 1 wherein the compound is 1,5,9-cyclododecatriene.

References Cited

UNITED STATES PATENTS

| | | | |
|---|---|---|---|
| 2,321,620 | 6/1943 | Pratt | 260—619 |
| 2,553,470 | 5/1951 | Pines et al. | 260—624 |
| 3,232,994 | 2/1966 | Apel et al. | |
| 2,864,868 | 12/1958 | Bader. | |
| 3,347,935 | 10/1967 | Kaup et al. | |
| 3,357,947 | 12/1967 | Stockmann et al. | |
| 3,408,407 | 10/1968 | Cotter et al. | |

OTHER REFERENCES

Richardson et al., Jour. Amer. Chem. Soc. vol. 62 (1940), pp. 413–415.

BERNARD HELFIN, Primary Examiner

U.S. Cl. X.R.

252—364, 52; 260—619, 612, 621, 624, 625, 33.2, 652.5, 999, 482, 47, 51, 37, 38

PO-1050
(5/69)

UNITED STATES PATENT OFFICE
CERTIFICATE OF CORRECTION

Patent No. 3,539,646               Dated November 10, 1970

Inventor(s) Bobby F. Dannels and Alvin F. Shepard

It is certified that error appears in the above-identified patent and that said Letters Patent are hereby corrected as shown below:

At column 2, line 12, for "with" read "the".

At column 2, line 28, for "$C_xH_{2x-5}$" read "$C_xH_{2x-6}$".

Column 9, line 56, for "(108g.) 1.0m.)" read "(54 grams)".

Signed and sealed this 13th day of July 1971.

(SEAL)
Attest:

EDWARD M. FLETCHER, JR.           WILLIAM E. SCHUYLER, JR.
Attesting Officer                 Commissioner of Patents